(12) United States Patent
Douceur et al.

(10) Patent No.: US 9,432,401 B2
(45) Date of Patent: Aug. 30, 2016

(54) PROVIDING CONSISTENT SECURITY INFORMATION

(75) Inventors: John R. Douceur, Bellevue, WA (US); Bryan Parno, Bellevue, WA (US); Robert W. Reeder, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 83 days.

(21) Appl. No.: 13/542,666

(22) Filed: Jul. 6, 2012

(65) Prior Publication Data

US 2014/0013426 A1    Jan. 9, 2014

(51) Int. Cl.
*G06F 11/00* (2006.01)
*H04L 29/06* (2006.01)
*G06F 21/51* (2013.01)

(52) U.S. Cl.
CPC ............ *H04L 63/1483* (2013.01); *G06F 21/51* (2013.01); *G06F 2221/2119* (2013.01)

(58) Field of Classification Search
CPC    H04L 63/1441; H04L 63/1483; G06F 21/51
USPC .......................................................... 713/168
See application file for complete search history.

(56) References Cited

U.S. PATENT DOCUMENTS

| | | | |
|---|---|---|---|
| 8,019,689 B1* | 9/2011 | Nachenberg ................... | 705/64 |
| 8,079,087 B1* | 12/2011 | Spies et al. ..................... | 726/26 |
| 2006/0068755 A1 | 3/2006 | Shraim et al. | |
| 2006/0168066 A1 | 7/2006 | Helsper et al. | |
| 2006/0253584 A1* | 11/2006 | Dixon et al. ................... | 709/225 |
| 2007/0005702 A1* | 1/2007 | Tokuda et al. ................. | 709/206 |
| 2007/0011739 A1 | 1/2007 | Zamir et al. | |
| 2007/0079379 A1* | 4/2007 | Sprosts et al. ................. | 726/24 |
| 2007/0130327 A1* | 6/2007 | Kuo et al. ...................... | 709/224 |
| 2007/0136806 A1 | 6/2007 | Berman | |
| 2007/0199054 A1* | 8/2007 | Florencio et al. ............. | 726/5 |
| 2007/0283000 A1 | 12/2007 | Proux et al. | |

(Continued)

FOREIGN PATENT DOCUMENTS

| | | |
|---|---|---|
| CN | 101059818 A | 10/2007 |
| CN | 101378369 A | 3/2009 |

OTHER PUBLICATIONS

Egelman, et al., "You've Been Warned: An Empirical Study of the Effectiveness of Web Browser Phishing Warnings", Retrieved at <<http://citeseerx.ist.psu.edu/viewdoc/download?doi=10.1.1.141.6025&rep=rep1&type=pdf>>, CHI'08 Proceedings of the twenty-sixth annual SIGCHI conference on Human factors in computing systems, Apr. 5, 2008, pp. 1065-1074.

(Continued)

*Primary Examiner* — Techane Gergiso
(74) *Attorney, Agent, or Firm* — Aneesh Mehta; Kate Drakos; Micky Minhas (57) ABSTRACT

A method for providing consistent security information between multiple applications is described herein. The method includes detecting potentially deceptive content from a communication application in a browser application. The method also includes generating consistent security information for the potentially deceptive content with the browser application. Additionally, the method includes sending the consistent security information for the potentially deceptive content to the communication application. Furthermore, the method includes providing a warning based on the consistent security information to the communication application.

12 Claims, 4 Drawing Sheets

(56) References Cited

U.S. PATENT DOCUMENTS

| | | | |
|---|---|---|---|
| 2008/0028443 A1* | 1/2008 | Adelman et al. | 726/4 |
| 2008/0114709 A1 | 5/2008 | Dixon et al. | |
| 2008/0172741 A1 | 7/2008 | Reumann et al. | |
| 2008/0184366 A1* | 7/2008 | Alperovitch et al. | 726/22 |
| 2008/0222425 A1* | 9/2008 | Buss | 713/185 |
| 2008/0256622 A1* | 10/2008 | Neystadt et al. | 726/14 |
| 2008/0288278 A1* | 11/2008 | Buss | 705/1 |
| 2009/0119402 A1* | 5/2009 | Shull et al. | 709/224 |
| 2009/0328209 A1* | 12/2009 | Nachenberg | 726/22 |
| 2010/0036946 A1 | 2/2010 | von Arx | |
| 2010/0042931 A1* | 2/2010 | Dixon et al. | 715/738 |
| 2010/0057895 A1* | 3/2010 | Huang | 709/222 |
| 2010/0115040 A1* | 5/2010 | Sargent et al. | 709/206 |
| 2010/0192196 A1* | 7/2010 | Lee | 726/1 |
| 2010/0281536 A1 | 11/2010 | Richards et al. | |
| 2011/0040974 A1* | 2/2011 | Kaplan | 713/176 |
| 2012/0180138 A1* | 7/2012 | Zaltzman et al. | 726/26 |
| 2012/0233665 A1* | 9/2012 | Ranganathan et al. | 726/4 |
| 2012/0311703 A1* | 12/2012 | Yanovsky et al. | 726/22 |
| 2012/0324568 A1* | 12/2012 | Wyatt et al. | 726/13 |
| 2013/0138428 A1* | 5/2013 | Chandramouli et al. | 704/9 |
| 2013/0254880 A1* | 9/2013 | Alperovitch et al. | 726/22 |

OTHER PUBLICATIONS

Sunshine, et al., "Crying Wolf: An Empirical Study of SSL Warning Effectiveness", Retrieved at <<http://www.guanotronic.com/~serge/papers/sec09.pdf>>, SSYM'09 Proceedings of the 18th conference on USENIX security symposium, Aug. 10, 2009, pp. 399-416.

Kuo, et al., "Browser Enhancements for Preventing Phishing Attacks", Retrieved at <<http://research.microsoft.com/pubs/138297/browser.pdf >> Retrieved Date: Apr. 30, 2012, pp. 19.

Biddle, et al., "Browser Interfaces and Extended Validation SSL Certificates: An Empirical Study", Retrieved at <<http://citeseerx.ist.psu.edu/viewdoc/download?doi=10.1.1.159.1288&rep=rep1&type=pdf>>, Proceedings of the 2009 ACM workshop on Cloud computing security, Nov. 2009, pp. 19-30.

International Search Report for International (PCT) Patent Application No. PCT/US2013/049412, mailed Oct. 9, 2013, 10 pages (English).

First Office Action and Search Report Issued in Chinese Patent Application No. 201380036189.3, Mailed Date: Jun. 27, 2016, 12 Pages.

* cited by examiner

PROVIDING CONSISTENT SECURITY INFORMATION

BACKGROUND

As individuals increasingly use a variety of email applications, social media services, and instant messenger applications to share information, the individuals become susceptible to a multitude of deceptive communications. One common deceptive communication attempts to trick individuals into following a hyperlink to a malicious online location using hooks. The hooks are communications that appear to be from a trusted entity, but are actually generated by criminals attempting to access confidential information. The hooks can be designed to evoke a sense of urgency and a desire to act promptly. For example, a hook can be an email that appears to be from an individual's bank. The email can instruct the individual to follow a hyperlink to a website immediately or the individual's bank account will be frozen. The website may appear to be affiliated with the individual's bank; however, the website may actually be controlled by a criminal. Detecting deceptive communications can allow applications to warn individuals of communications that can compromise confidential information.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment provides a method for providing consistent security information between multiple applications. The method includes detecting potentially deceptive content from a communication in a browser application. The method also includes generating consistent security information for the potentially deceptive content with the browser application. Additionally, the method includes sending the consistent security information for the potentially deceptive content to a communication application. Furthermore, the method includes providing a warning based on the consistent security information to the communication application.

Another embodiment is a system for providing consistent security information. The system includes a display device to display potentially deceptive content, a processor that executes processor executable code and a storage device that stores processor executable code. The system detects potentially deceptive content from a communication with a browser. The system also sends the potentially deceptive content to a reputation server. Additionally, the system retrieves a reputation for the potentially deceptive content from the reputation server. Furthermore, the system stores the reputation as the consistent security information. In addition, the system sends the consistent security information of the potentially deceptive content to a communication application.

Another embodiment provides one or more tangible computer-readable storage media comprising a plurality of instructions. The instructions cause a processor to detect potentially deceptive content from a communication with a browser. The instructions also cause a processor to generate consistent security information for the potentially deceptive content. Furthermore, the instructions cause a processor to send the consistent security information for the potentially deceptive content to a communication application.

BRIEF DESCRIPTION OF THE DRAWINGS

The following detailed description may be better understood by referencing the accompanying drawings, which contain specific examples of numerous objects and features of the disclosed subject matter.

DETAILED DESCRIPTION

Various methods for detecting deceptive communications have been developed. Some of the methods include attempting to detect deceptive communications in email applications or instant messenger applications. However, email applications and instant messenger applications may not be designed to evaluate whether a communication is deceptive. Rather, browsers may have access to additional information regarding the communication, which allows the browser to determine if a communication is deceptive. For example, some browsers may display a warning when a user attempts to access a deceptive website from a hyperlink included in a communication. However, users can become confused if an email application displays an email with a hyperlink that appears to be from a trusted source and a browser displays a warning message indicating a user is attempting to access a deceptive website when the hyperlink is selected. Some users may select a hyperlink in a deceptive email, view a browser's warning regarding a deceptive website associated with the hyperlink, and then repeatedly select the hyperlink in the deceptive email. The users may repeatedly select the hyperlink because the users cannot determine if the deceptive email is a trusted source of information or the browser's warning is a trusted source. Therefore, many users may decide that the deceptive email is a trusted source and ignore the browser's warning by proceeding to the deceptive website.

According to embodiments disclosed herein, browsers can be modified to send consistent security information to other applications. A browser, as referred to herein, includes any application that can access, retrieve, and display information from a network. The consistent security information, as referred to herein, includes any information that indicates a possibly deceptive communication. A possibly deceptive communication, as referred to herein, includes communications that contain possibly deceptive content such as misleading hyperlinks, misspelled hyperlinks, or any other content that can be used to retrieve confidential information from a user. A communication can include text, voice, or video communications, among others. For example, a communication may include an email, a text message, or a message viewed through a social media website. The communications can be transmitted via various communication applications such as email applications, instant messenger applications, social media applications, operating systems, or any other software or service. Once a browser has sent consistent security information regarding the content of a communication to another application, the application can display the consistent security information along with a deceptive communication. Therefore, users viewing a deceptive communication are not confused about two applications, such as a browser and email application, displaying conflicting information. The user can then be prevented from accessing deceptive content in a communication.

Figure 1:
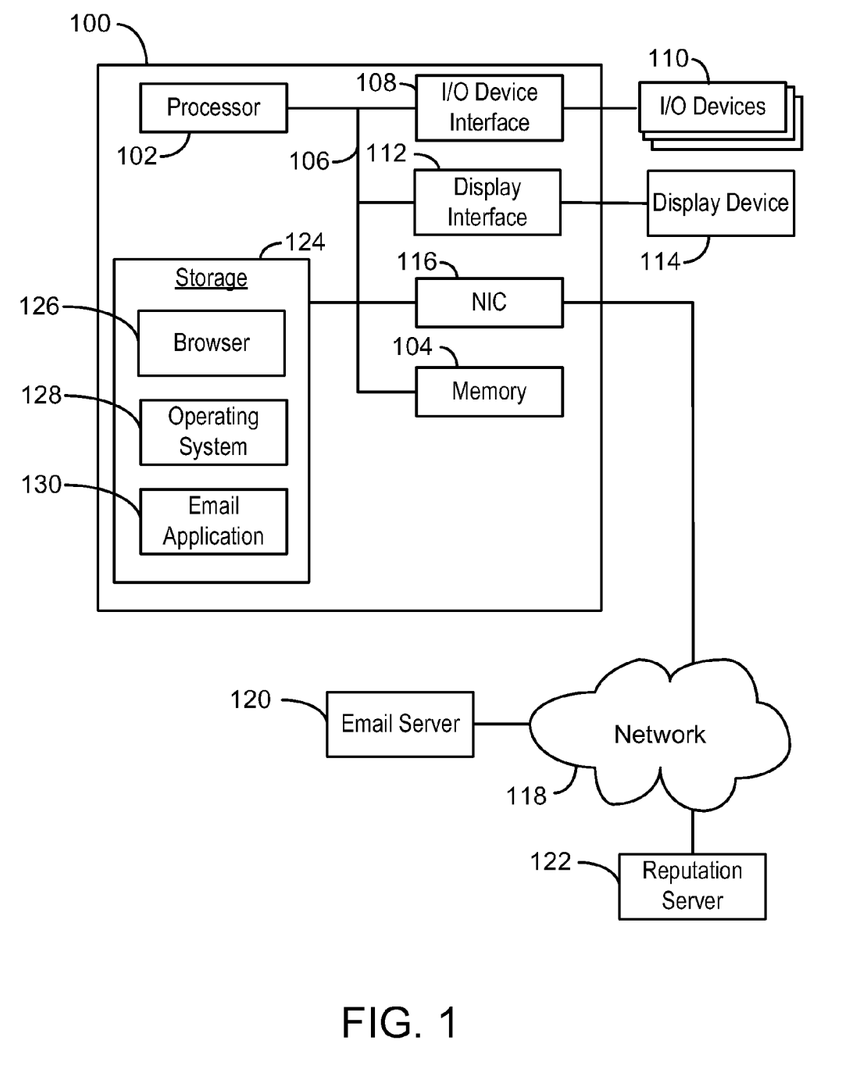
FIG. 1 is a block diagram of an example of a computing system that provides consistent security information between a browser and additional applications.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that provides consistent security information between a web browser and additional applications. The computing system 100 may be, for example, a mobile phone, laptop computer, desktop computer, or tablet computer, among others. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions that are executed by the processor 102 may be used to provide consistent security information between a web browser and additional applications.

The processor 102 may be connected through a system bus 106 (e.g., PCI, ISA, PCI-Express, HyperTransport®, NuBus, etc.) to an input/output (I/O) device interface 108 adapted to connect the computing system 100 to one or more I/O devices 110. The I/O devices 110 may include, for example, a keyboard, a gesture recognition input device, and a pointing device, wherein the pointing device may include a touchpad or a touchscreen, among others. The I/O devices 110 may be built-in components of the computing system 100, or may be devices that are externally connected to the computing system 100.

The processor 102 may also be linked through the system bus 106 to a display interface 112 adapted to connect the computing system 100 to a display device 114. The display device 114 may include a display screen that is a built-in component of the computing system 100. The display device 114 may also include a computer monitor, television, or projector, among others, that is externally connected to the computing system 100.

A network interface card (NIC) 116 may be adapted to connect the computing system 100 through the system bus 106 to a network 118. The network 118 may be a wide area network (WAN), local area network (LAN), or the Internet, among others. Through the network 118, the computing system 100 may communicate with an email server 120. The email server 120 can accept, store, and receive emails or any other text, audio, or video transmission. Through the network 118, the computing system 100 may also communicate with a reputation server 122. The reputation server 122 can generate reputation information for a communication and send the reputation information to the computing system 100. The reputation, as referred to herein, can include any information that indicates if a communication is deceptive. For example, reputation information can include whether the communication is known to be safe, known to be deceptive, or the reputation for a communication is unknown.

The storage 124 can include a hard drive, an optical drive, a USB flash drive, an array of drives, or any combinations thereof. The storage 124 may include a browser 126, an operating system 128, and an email application 130. The browser 126, as discussed above, includes any application that can access, retrieve, and display information from a network. The operating system 128 can include various software applications that manage computing system 100 resources including software stored in storage 124. The email application 130 can store, retrieve, and send emails based on a variety of protocols including the post office protocol (POP) and the internet message access protocol (IMAP), among others.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional applications, additional memory devices, additional network interfaces, etc.). For example, the computing system 100 may include a social media application that can send and receive communications or consistent security information from an operating system and/or a browser. Furthermore, any of the functionalities of the browser 126 may be partially, or entirely, implemented in hardware and/or in the processor 102. For example, the functionality may be implemented with an application specific integrated circuit, in logic implemented in the processor 102, or in any other device.

Figure 2:
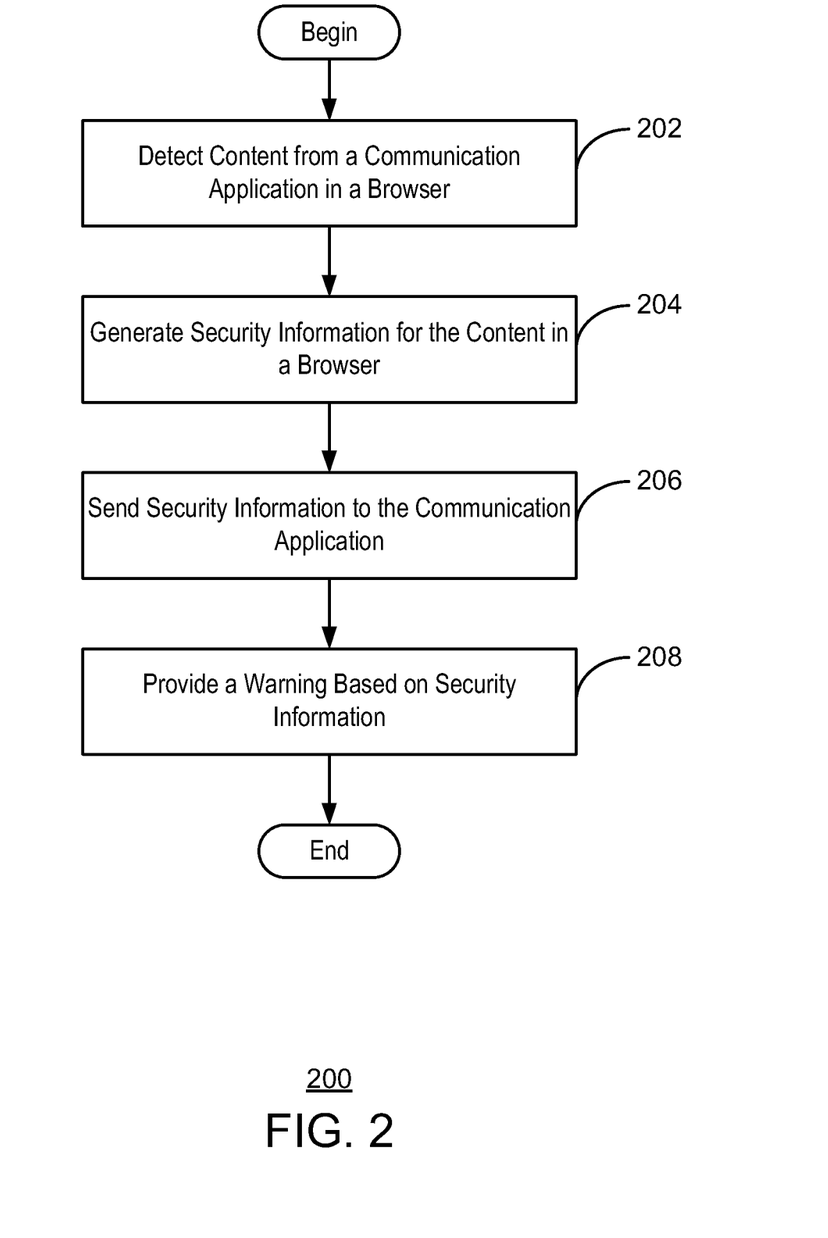
FIG. 2 is a process flow diagram illustrating an example of providing consistent security information between multiple applications.

FIG. 2 is a process flow diagram illustrating an example of providing consistent security information between multiple applications. The method 200 for providing consistent security information between multiple applications can be implemented with a computing system 100 of FIG. 1. In some embodiments, the method 200 may include providing consistent security information between a browser 126 of FIG. 1 and an email application 130 of FIG. 1.

At block 202, potentially deceptive content from a communication application is detected in a browser. Potentially deceptive content, as referred to herein, can include any communication, information related to a communication or a portion of a communication that includes potentially deceptive or malicious content. For example, potentially deceptive content can include a hyperlink included in an email or information identifying the original source of an email such as an email address. A hyperlink, as referred to herein, is a reference that can direct a user to a destination such as a URL or downloadable file, among others. For example, an individual may receive a deceptive email that contains a hyperlink that directs the individual to a website controlled by a criminal. The potentially deceptive content may be sent to the browser from any communication application, such as an email application, an operating system, a social media application, an instant messenger application, or any other application. For example, if a user chooses to follow a hyperlink in a deceptive email, the hyperlink can be sent to a browser. If a user does not follow the hyperlink, the deceptive email may be unable to access confidential information belonging to the user.

At block 204, consistent security information for the potentially deceptive content is generated in the browser. The consistent security information can include any information that indicates the possible inclusion of deceptive or malicious content in a communication. In some embodiments, consistent security information may include a reputation for content. The reputation can indicate if content is known to be safe, known to be deceptive, or the safety of the content is unknown. The reputations for a variety of content may be stored in a database. The browser can send the content to a reputation server, which can then return the reputation for the content. By accessing a reputation server, a browser can obtain dynamically updated consistent security information for content. For example, a SmartScreen® Filter may generate a reputation for the content by accessing servers that include reputation information. In some embodiments, the reputation server may include reputations for hyperlinks, websites and downloadable files, among others. In other embodiments, the browser may generate consistent security information based on data stored in a computing system. For example, a browser may evaluate and store consistent security information for each hyperlink accessed by a browser. In these embodiments, a browser can generate consistent security information for previously accessed hyperlinks without retrieving a reputation from a reputation server.

At block 206, the consistent security information for the potentially deceptive content is sent from the browser to the communication application. In some embodiments, the communication application can display consistent security information regarding the reputation of the potentially deceptive content along with the potentially deceptive content. For example, an email application may send a hyperlink that a user has selected to a browser. The browser can then generate consistent security information for the hyperlink, which can include an indication if the hyperlink may direct the user to a deceptive website. The browser can then return the consistent security information to the email application. The email application can then display consistent security information in the same application that the user uses to view emails.

At block 208, a warning is provided based on the consistent security information. The warning can indicate potentially deceptive content such as misleading or misspelled hyperlinks. In some embodiments, the warning is sent to the communication application, which allows a user to see the warning for potentially deceptive content within a communication application. For example, a communication application can display a warning regarding a hyperlink that leads to a deceptive website along with the deceptive email attempting to retrieve confidential information from the user. As discussed above, displaying consistent security information in the same application that accesses communications can prevent a user from mistaking a deceptive communication as a trusted source and compromising confidential information.

The process flow diagram of FIG. 2 is not intended to indicate that the steps of the method 200 are to be executed in any particular order, or that all of the steps of the method 200 are to be included in every case. Further, any number of additional steps may be included within the method 200, depending on the specific application. In some embodiments, a browser may detect additional consistent security information based on user reviews of content, information regarding the content provided by search engines, or any other information regarding the security of the content. In other embodiments, the browser can detect content sent from an operating system. For example, an operating system may receive a hyperlink from an email application and send the hyperlink to a browser. The browser may then send consistent security information to the operating system, which the operating system forwards to an email application.

Figure 3:
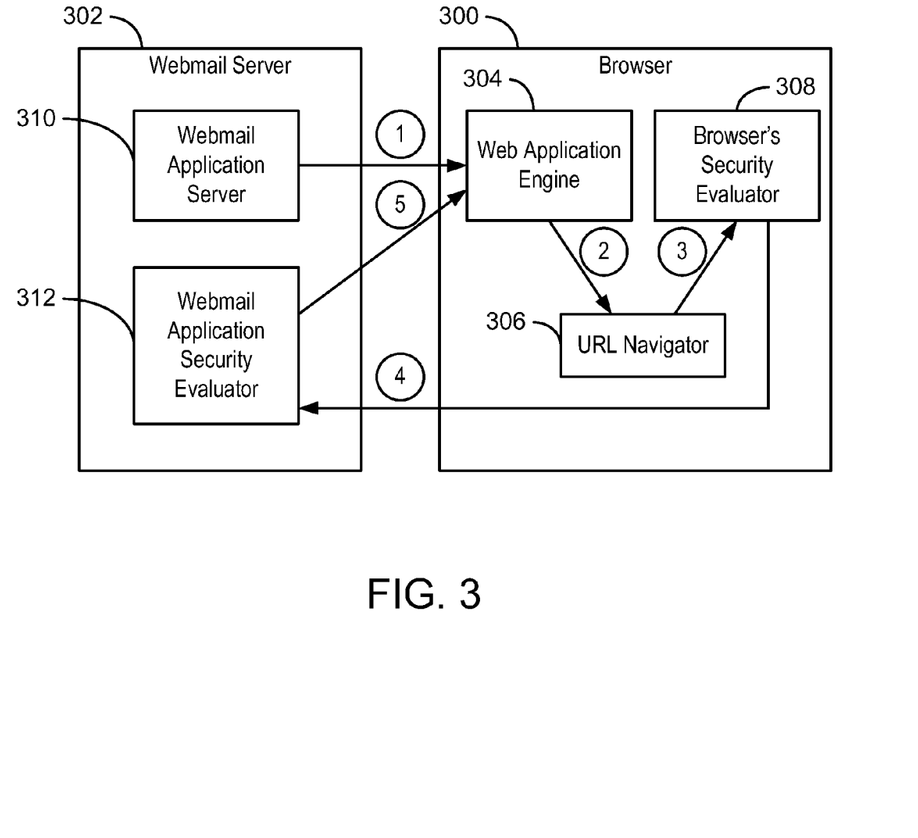
FIG. 3 illustrates an example of providing consistent security information from a browser to a webmail application.

FIG. 3 illustrates an example of providing consistent security information between a browser 300 and a webmail server 302. The browser 300 includes any application that can access, retrieve, and display information from a network. In some embodiments, the browser 300 includes a web application engine 304, a URL navigator 306, and a browser security evaluator 308. The web application engine 304 can manage data received from the webmail server 302. For example, the web application engine 304 can display email information and send user input to the webmail application server 302. The URL navigator 306 can detect a selected uniform resource locator (URL) and retrieve resources from the URL. For example, the URL navigator 306 can detect a domain name and retrieve information from a particular domain or website. The browser security evaluator 308 can detect consistent security information for content. In some embodiments, the browser security evaluator 308 can access reputation information for content and generate consistent security information based on the reputation information.

The webmail server 302 can include a webmail application server 310 and a webmail application security evaluator 312. The webmail application server 310 can send, receive and store email information such as emails, downloadable files, or email addresses, among other information. The webmail application security evaluator 312 can detect consistent security information and send the consistent security information to the web application engine 304.

In some embodiments, the webmail application server 310 can send email information (as indicated by the circled 1) to the web application engine 304. For example, an email containing a hyperlink may be sent from the webmail application server 310 to the web application engine 304. The hyperlink may contain a uniform resource locator (URL) for a website, or a downloadable file. The web application engine 304 can then display the email within the browser 300.

In some embodiments, the web application engine 304 can then send a URL (as indicated by a circled 2) to a URL navigator 306 in response to a URL selection. For example, a user may select a URL located within an email received by the web application engine 304. The URL navigator 306 can then attempt to retrieve information from the URL.

The URL navigator 306 can then send the URL (as indicated by a circled 3) to the browser security evaluator 308, which evaluates the safety of the URL by generating consistent security information. For example, the URL may be an attempt by a criminal to retrieve confidential information from a user. In some embodiments, the browser security evaluator 308 can detect attempts to mislead a user by accessing a reputation server such as servers used for the SmartScreen® Filter. In other embodiments, the browser security evaluator 308 can detect attempts to mislead a user without accessing a reputation server. For example, the browser's security evaluator may have access to any number of frequently visited URL's such as "www.microsoft.com." If the browser security evaluator 308 receives a URL that is an obvious misspelling of a frequently accessed URL, or contains a homograph spoofing such as "www.rnicrosoft.com," the browser security evaluator 308 can generate a warning. The warning may alert the user of a possible deceptive URL by notifying the user that the "m" in "Microsoft" has been changed to an "r" and an "n" which appears as an "m" when displayed together.

In other embodiments, the browser security evaluator 308 may detect a misleading URL. For example, the browser security evaluator 308 may receive a URL for "www.usersbank.deceptivewebsite.com." The browser security evaluator 308 may determine that the URL misleads the user because the URL does not retrieve information from the website for the user's bank. Instead, the URL retrieves information from the user's bank section of the deceptive website. Furthermore, the deceptive website may have an appearance similar to the user's bank website. However, the deceptive website may actually be controlled by a criminal attempting to retrieve confidential information from a user. In other examples, an email may contain text for a URL that directs a user to a different website than the text indicates. For example, an email may persuade a user to select a URL that has the displayed text of "http://microsoft.com." However, the actual website linked to the URL may be "www.deceptivewebsite.com."

The browser security evaluator 308 can then generate the consistent security information. In some embodiments, the consistent security information may indicate a hyperlink is a known safe source, a known deceptive source, or an unknown source. A known safe source includes content such as hyperlinks that do not direct a user to deceptive sources. A known deceptive source includes content such as hyperlinks that direct users to deceptive sources, such as websites operated by criminals. Unknown sources can include content such as hyperlinks that may or may not direct a user to a deceptive source because the content has not been evaluated. In other embodiments, the consistent security information may indicate a specific type of deceptive URL. For example, the consistent security information may indicate a URL appears to be misleading and, if selected, the URL may direct a user to a website operated by a criminal. The browser security evaluator 308 can then send (as indicated by a circled 4) the consistent security information to the webmail application security evaluator 312.

After retrieving the consistent security information from the browser security evaluator 308, the webmail security evaluator 312 can send the consistent security information (as indicated by a circled 5) to the web application engine 304. In some embodiments, the webmail application security evaluator 312 can also determine how the consistent security information is to be displayed in the web application engine 304. For example, the webmail application security evaluator 312 may determine that the consistent security information is to be displayed in a pop-up warning that requests for the user to acknowledge the consistent security information relating to potentially deceptive content. In other embodiments, the consistent security information is sent to the web application engine 304 and the web application engine 304 determines a configuration for displaying the consistent security information.

It is also to be understood that the block diagram of FIG. 3 is not intended to indicate that the browser 300 is to include all of the components shown in FIG. 3. Further, the user browser 300 may include any number of additional components not shown in FIG. 3, depending on the specific application.

Figure 4:
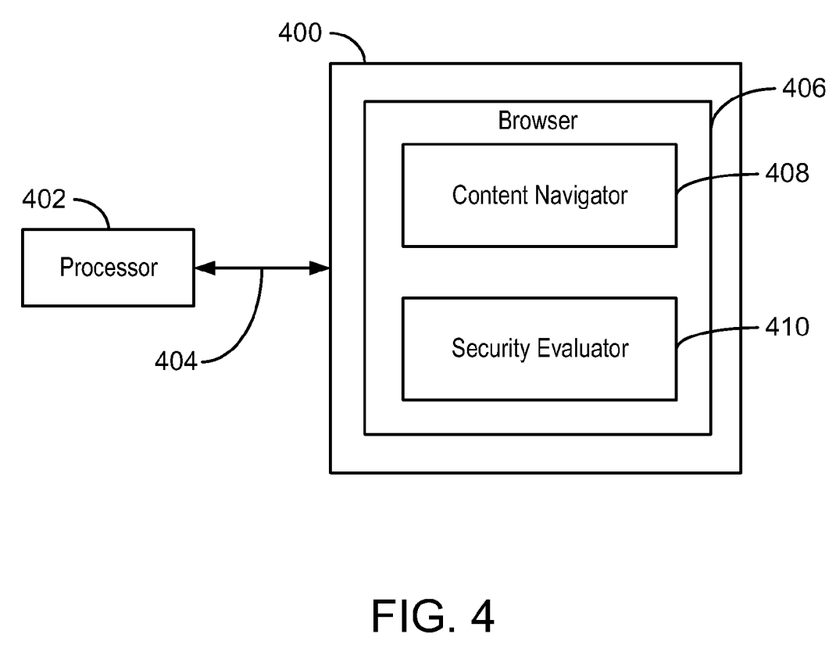
FIG. 4 is a block diagram depicting an example of a tangible, computer-readable medium that allows consistent security information to be provided between a browser and additional applications.

FIG. 4 is a block diagram showing a tangible, computer-readable medium 400 that allows consistent security information to be provided between a browser and additional applications. The tangible, computer-readable medium 400 may be accessed by a processor 402 over a computer bus 404. Furthermore, the tangible, computer-readable medium 400 may include code to direct the processor 402 to perform the steps of the current method.

The various software components discussed herein may be stored on the tangible, computer-readable medium 400, as indicated in FIG. 4. For example, a browser 406 may be adapted to direct the processor 402 to provide consistent security information between the browser and additional applications. The browser 406 may include a content navigator 408 and a security evaluator 410. The content navigator 408 may receive potentially deceptive content, such as a misspelled hyperlink, and send the content to the security evaluator 410. The security evaluator 410 can detect consistent security information regarding the content and send the consistent security information to the processor 402. It is to be understood that any number of additional software components not shown in FIG. 4 may be included within the tangible, computer-readable medium 400, depending on the specific application.

Although the subject matter has been described in language specific to structural features and/or methods, it is to be understood that the subject matter defined in the appended claims is not necessarily limited to the specific structural features or methods described above. For example, the present embodiments may be used to avoid spoofing attacks, internationalized domain name (IDN) homograph attacks, or phishing attacks, among others. Rather, the specific structural features and methods described above are disclosed as example forms of implementing the claims.

What is claimed is:

1. A method of providing consistent security information between multiple applications, comprising:
    detecting potentially deceptive content from a communication application in a browser application;
    generating the consistent security information for the potentially deceptive content with the browser application;
    sending the consistent security information for the potentially deceptive content to the communication application; and
    providing a warning from the browser application to the communication application, from which the potentially deceptive content is detected, based on the consistent security information to allow the warning to be displayed within the communication application, wherein the consistent security information is to prevent the warning from the browser application from conflicting with a separate warning from the communication application.

2. The method of claim 1, wherein the communication application comprises an email application.

3. The method of claim 2, wherein the email application comprises a webmail application server.

4. The method of claim 1, wherein generating the consistent security information for the potentially deceptive content comprises:
    sending the potentially deceptive content to a reputation server;
    retrieving a reputation for the potentially deceptive content from the reputation server;
    storing the reputation as the consistent security information.

5. The method of claim 1, wherein the communication application comprises a social media application.

6. The method of claim 1, wherein generating the consistent security information of the potentially deceptive content comprises detecting a misleading uniform resource locator.

7. The method of claim 1, wherein the consistent security information indicates the potentially deceptive content is a known safe source, a known deceptive source, or an unknown source.

8. The method of claim 1, wherein detecting the potentially deceptive content from the communication application comprises evaluating the potentially deceptive content based on previously evaluated hyperlinks.

9. A system for providing consistent security information comprising:
    a display device to display potentially deceptive content;
    a processor to execute processor executable code;
    a storage device that stores processor executable code, wherein the processor executable code, when executed by the processor, causes the processor to:
    detect potentially deceptive content from a communication application with a browser application, the potentially deceptive content comprising a hyperlink;
    generate consistent security information for the potentially deceptive content with the browser application;
    store a reputation as consistent security information;
    send the consistent security information of the potentially deceptive content to the communication application; and
    provide a warning from the browser application to the communication application, from which the potentially deceptive content is detected, based on the consistent security information to allow the warning to be displayed within the communication application, wherein the consistent security information is to prevent the warning from the browser application from conflicting with a separate warning from the communication application.

10. The system of claim 9, wherein the communication application comprises an email application.

11. The system of claim 10, wherein the email application comprises a webmail application server.

12. The system of claim 9, wherein the reputation indicates the potentially deceptive content is a safe source, a known deceptive source, or an unknown source.

* * * * *